(12) United States Patent
Preisler et al.

(10) Patent No.: US 8,808,834 B2
(45) Date of Patent: Aug. 19, 2014

(54) SANDWICH-TYPE, STRUCTURAL, COMPOSITE PANEL HAVING A PATTERN OF DEPRESSIONS FORMED AT A LOWER OUTER SURFACE THEREOF AND STIFFENING SUPPORTS RECEIVED AND RETAINED THEREIN

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 3 days.

(21) Appl. No.: 13/762,832

(22) Filed: Feb. 8, 2013

(65) Prior Publication Data

US 2014/0147622 A1  May 29, 2014

Related U.S. Application Data

(63) Continuation-in-part of application No. 13/687,213, filed on Nov. 28, 2012, and a continuation-in-part of application No. 13/689,809, filed on Nov. 30, 2012, and a continuation-in-part of application No. 13/690,566, filed on Nov. 30, 2012.

(51) Int. Cl.
| | | |
|---|---|---|
| *B32B 3/08* | (2006.01) | |
| *B32B 5/14* | (2006.01) | |
| *B32B 3/12* | (2006.01) | |
| *B32B 3/02* | (2006.01) | |
| *B29C 43/00* | (2006.01) | |
| *B60R 5/04* | (2006.01) | |
| *B32B 3/26* | (2006.01) | |
| *B32B 3/30* | (2006.01) | |

(52) U.S. Cl.
CPC . *B32B 3/085* (2013.01); *B32B 3/12* (2013.01); *B32B 5/145* (2013.01); *B32B 3/02* (2013.01); *B29C 43/00* (2013.01); *B60R 5/04* (2013.01); *B32B 3/263* (2013.01); *B32B 3/30* (2013.01)
USPC ........ 428/116; 296/39.1; 296/39.2; 296/39.3; 296/97.23; 428/95; 428/98; 428/99

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| | | |
|---|---|---|
| 5,026,445 A | 6/1991 | Mainolfi et al. |
| 5,298,694 A | 3/1994 | Thompson et al. |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A sandwich-type, structural, composite panel having a pattern of depressions formed at a lower outer surface thereof and stiffening supports received and retained therein is provided. The panel includes a first outer layer having a first outer surface, a second outer layer having a second outer surface and a core positioned between the outer layers and having a large number of cavities. The outer layers are bonded to the core by press molding. Crushed portions of the panel having a reduced thickness form the pattern of depressions at the second outer surface of the second outer layer. The stiffening supports are bonded or joined to the second outer layer within the pattern of depressions. The stiffening supports are sized, shaped and arranged within the pattern of depressions to provide the panel with strength to resist deflection from a load at various positions and orientations at the first outer surface.

16 Claims, 4 Drawing Sheets

(56) References Cited

U.S. PATENT DOCUMENTS

| | | |
|---|---|---|
| 5,502,930 A | 4/1996 | Burkette et al. |
| 5,683,782 A | 11/1997 | Duchene |
| 5,915,445 A | 6/1999 | Rauenbusch |
| 5,979,962 A | 11/1999 | Balentin et al. |
| 6,050,630 A | 4/2000 | Hochet |
| 6,066,217 A | 5/2000 | Dibble et al. |
| 6,102,464 A | 8/2000 | Schneider et al. |
| 6,102,630 A | 8/2000 | Flolo |
| 6,435,577 B1 | 8/2002 | Renault |
| 6,537,413 B1 | 3/2003 | Hochet et al. |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,790,026 B2 | 9/2004 | Vandangeot et al. |
| 6,793,747 B2 | 9/2004 | North et al. |
| 6,823,803 B2 | 11/2004 | Preisler |
| 6,843,525 B2 | 1/2005 | Preisler |
| 6,890,023 B2 | 5/2005 | Preisler et al. |
| 6,981,863 B2 | 1/2006 | Renault et al. |
| 7,014,259 B2 | 3/2006 | Heholt |
| 7,090,274 B1 | 8/2006 | Khan et al. |
| 7,093,879 B2 | 8/2006 | Putt et al. |
| 7,264,685 B2 | 9/2007 | Katz et al. |
| 7,320,739 B2 | 1/2008 | Thompson, Jr. et al. |
| 7,402,537 B1 | 7/2008 | Lenda et al. |
| 7,419,713 B2 | 9/2008 | Wilkens et al. |
| 7,837,009 B2 | 11/2010 | Gross et al. |
| 7,909,379 B2 | 3/2011 | Winget et al. |
| 7,918,313 B2 | 4/2011 | Gross et al. |
| 7,919,031 B2 | 4/2011 | Winget et al. |
| 8,117,972 B2 | 2/2012 | Winget et al. |
| 8,622,456 B2 | 1/2014 | Preisler et al. |
| 8,690,233 B2 | 4/2014 | Preisler et al. |
| 2003/0079659 A1* | 5/2003 | Preisler et al. ............... 108/51.3 |
| 2005/0189674 A1 | 9/2005 | Hochet et al. |
| 2006/0185866 A1 | 8/2006 | Jung et al. |
| 2006/0255611 A1 | 11/2006 | Smith et al. |
| 2007/0069542 A1 | 3/2007 | Steiger et al. |
| 2008/0105866 A1 | 5/2008 | Jeong et al. |
| 2010/0026031 A1 | 2/2010 | Jouraku |
| 2011/0315310 A1 | 12/2011 | Trevisan et al. |
| 2013/0278002 A1 | 10/2013 | Preisler et al. |
| 2013/0278003 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280469 A1 | 10/2013 | Preisler et al. |
| 2013/0280472 A1 | 10/2013 | Preisler et al. |
| 2013/0280473 A1 | 10/2013 | Preisler et al. |
| 2013/0312652 A1 | 11/2013 | Preisler et al. |
| 2013/0316123 A1 | 11/2013 | Preisler et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0145465 A1 | 5/2014 | Preisler et al. |
| 2014/0145470 A1 | 5/2014 | Preisler et al. |
| 2014/0147617 A1 | 5/2014 | Preisler et al. |
| 2014/0147622 A1 | 5/2014 | Preisler et al. |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.
Office Action, corresponding U.S. Appl. No. 13/687,232, date of mailing Mar. 28, 2014.

* cited by examiner

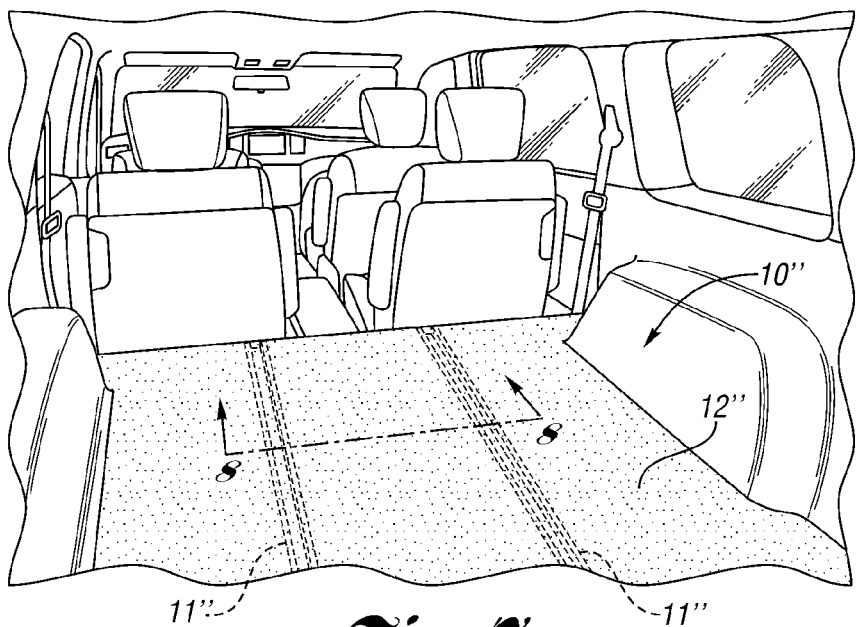
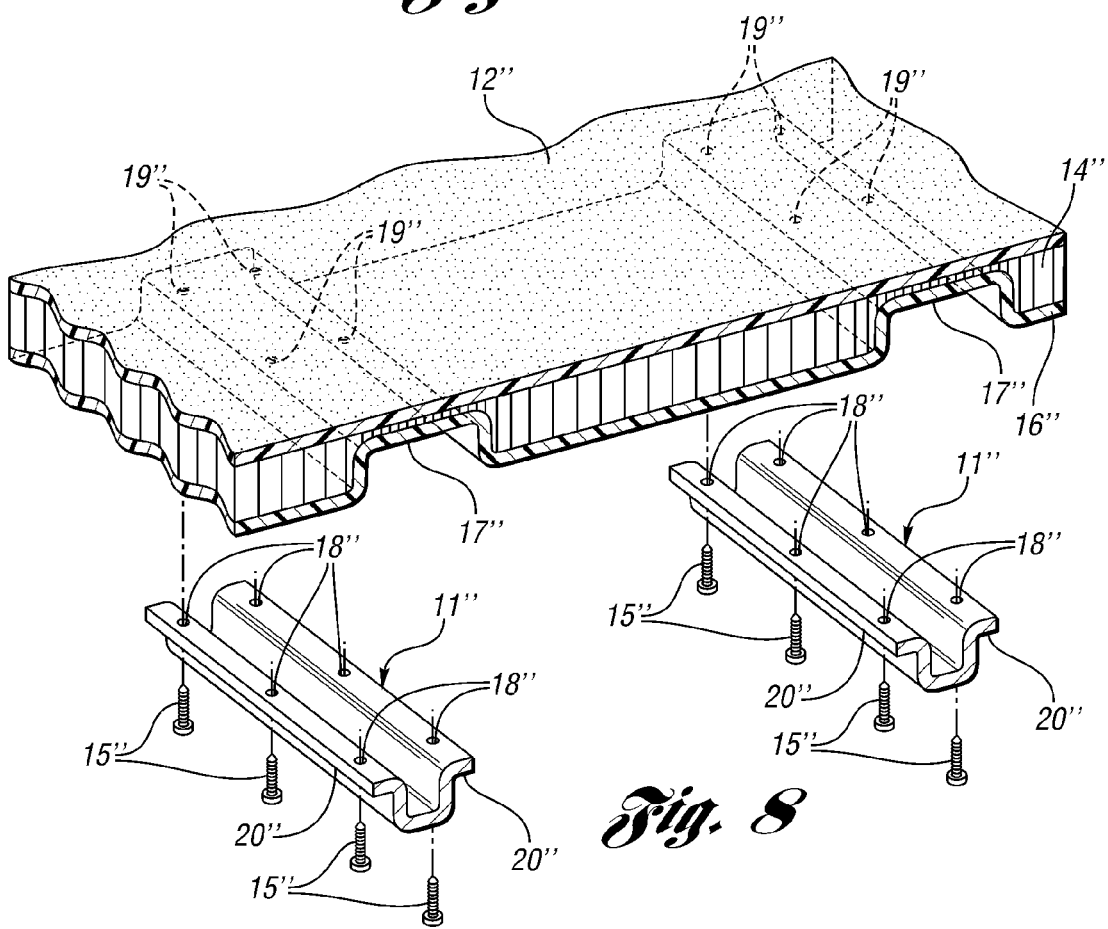

SANDWICH-TYPE, STRUCTURAL, COMPOSITE PANEL HAVING A PATTERN OF DEPRESSIONS FORMED AT A LOWER OUTER SURFACE THEREOF AND STIFFENING SUPPORTS RECEIVED AND RETAINED THEREIN

CROSS-REFERENCE TO RELATED APPLICATIONS

This application is a continuation-in-part application of U.S. Application entitled "Assembly Including a Compression-Molded, Composite Panel Locally Reinforced Adjacent a Living Hinge of the Assembly" filed Nov. 28, 2012 and having U.S. Ser. No. 13/687,213. This application is also a continuation-in-part application of U.S. Patent Application entitled "Sandwich-Type, Structural Component Composite Having a Cut-Out Feature With a Substantially Hidden Core Assembly Utilizing Same and Panel for use in a Vehicle Load Floor Assembly" filed Nov. 30, 2012, and having U.S. Ser. No. 13/689, 809.

This application is further a continuation-in-part application of U.S. Patent Application entitled "Compression-Molded Compression Component Having a Sandwich Structure and Having Integrally Formed Strengthening Structures" also filed Nov. 30, 2012 and having U.S. Ser. No. 13/690,566.

OVERVIEW

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load-bearing capacity of the composite component.

As a result of their high stiffness-to-weight ratio and load bearing capacity, such compression-molded composites have been used as load floors in automotive applications and as skis or snowboards (i.e., sliding boards) in recreational applications.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a stampable reinforced thermoplastics material, a cellular core made of a thermoplastics material, and a second skin also made of a stampable reinforced thermoplastics material. The stack may also include one or more external covering layers made of a woven or non-woven thermoplastic material. The skins are typically pre-heated outside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

The following U.S. patent documents are related to the present invention: U.S. Pat. Nos. 5,683,782; 7,419,713; 6,890,023; 6,843,525; 6,537,413; 6,050,630; and 2005/0189674.

One problem associated with such composites is that their function and design freedom is limited by their designed material thickness.

Other U.S. patent documents related to the present invention include: U.S. Pat. Nos. 5,502,930; 5,915,445; 6,102,464; 6,435,577; 6,655,299; 6,682,675; 6,748,876; 6,790,026; 6,682,676; 6,823,803; 6,981,863; 7,090,274; 7,909,379; 7,919,031; 8,117,972; 2006/0255611; 2007/0069542; 2008/0185866; 2006/0185866; and 2011/0315310.

A wide variety of welding technologies exist to join or bond plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies.

Also, a wide variety of adhesives such as liquid and heat-sensitive solid film adhesive may be used to join plastic components together. Oftentimes a mold is used in the bonding process. U.S. Pat. Nos. 8,133,419; 5,534,097 and 2011/0315310 are examples.

Another problem associated with the prior art is that it is often not desirable to increase the thickness of the core in order to increase the load bearing capacity of the composite component. Increasing the thickness of the core reduces the amount of available space in which the component is located. For example, in a vehicle the amount of space available for storage is typically quite limited. By reducing the thickness of the core, the amount of available space useful for storage can be increased substantially especially if such components cover a relatively large surface area. One possible solution to the above problem is to provide additional supports at the underside of the component. However, conventional wisdom says that this adds additional cost and weight to the component as well as takes away valuable storage space due to the increased thickness of the resulting component.

Yet another problem associated with the prior art is that load supporting panels must satisfy OEM deflection criteria in an automotive setting. Typical OEM deflection criteria are as follows:

Max Allowable Deflection Range: 8-15 mm from baseline "A" (FIG. 4) from a load exerting a force "F" on a panel comprising outer skins 12 and 16 and a honeycomb core 14 therebetween.

Load Surface Size: 4: Diameter of 10"×10" square;

Test Temperature: −30 C, ambient, 85 C;

Surrounding Support: Depends on application, but mainly 4-sided support; and

Other Requirements: No part damage or permanent set greater than 3 mm

SUMMARY OF EXAMPLE EMBODIMENTS

An object of at least one embodiment of the present invention is to provide a sandwich-type structural, composite panel having a pattern of depressions formed at a lower outer surface thereof and stiffening supports received and retained therein to strengthen the panel without increasing the thickness or quality of a core of the panel while minimizing additional cost and weight of the resulting panel.

In carrying out the above object and other objects of at least one embodiment of the present invention, a sandwich-type, structural, composite panel is provided. The panel includes a first outer layer having a first outer surface, a second outer layer having a second outer surface and a core positioned between the outer layers and having a large number of cavities. The outer layers are bonded to the core by press molding. Crushed portions of the panel having a reduced thickness form a pattern of depressions at the second outer surface of the second outer layer. The mold also includes a plurality of stiffening supports bonded or joined to the second outer layer within the pattern of depressions. The stiffening supports are sized, shaped and arranged within the pattern of depressions to provide the panel with strength to resist deflection from a load at various positions and orientations at the first outer surface.

The stiffening supports may comprise a pair of substantially parallel rails, each of the rails having a height substantially equal to depth of its respective depression.

Each of the rails may be u-shaped in cross-section wherein each of the rails has laterally extending flange portions for bonding or joining the rails to the second outer layer in the pattern of depressions.

The pattern of depressions may include a pair of spaced, substantially parallel depressions which extend between opposite sides of the panel.

Each of the stiffening supports may be made of a plastic wherein each of the stiffening supports is bonded to the outer surface of the second outer layer within its respective depression.

The panel may further include a plurality of fasteners to fasten the stiffening supports to the second outer layer within the pattern of depressions.

The fasteners may be threaded fasteners which extends completely through their respective stiffening components. Each of the fasteners may be externally threaded.

The core may be a cellular core such as a thermoplastic honeycomb core.

The outer layers may be fiber reinforced layers.

The panel may have a thickness in a range of 5 to 25 mm.

The outer layers may be thermoplastic layers and the core may be a thermoplastic core.

At least one of the outer layers and preferably both of the outer layers may be woven layers.

Further in carrying out the above object and other objects of at least one embodiment of the present invention, a sandwich-type, structural, composite panel for use in the interior of a vehicle is provided. The panel includes a first outer layer having a first outer surface, a second outer layer having a second outer surface and a core positioned between the outer layers and having a large number of cavities. The outer layers are bonded to the core by press molding. Crushed portions of the panel having a reduced thickness form a pattern of depressions at the second outer surface of the second outer layer. A plurality of stiffening supports are bonded or joined to the second outer layer within the pattern of depressions. The stiffening supports are sized, shaped and arranged within the pattern of depressions to provide the panel with strength to resist deflection from a load at various positions and orientations at the first outer surface.

The stiffening supports may comprise a pair of substantially parallel rails. Each of the rails may have a height substantially equal to depth of its respective depression.

Still further in carrying out the above object and other objects of at least one embodiment of the present invention, a sandwich-type, structural, composite vehicle load floor panel is provided. The panel includes a first outer layer having a load-bearing, first outer surface, a second outer layer having a second outer surface and a core positioned between the outer layers and having a large number of cavities. The outer layers are bonded to the core by press molding. Crushed portions of the panel having a reduced thickness form a pattern of depressions at the second outer surface of the second outer layer. A plurality of stiffening supports are bonded or joined to the second outer layer within the pattern of depressions. The stiffening supports are sized, shaped and arranged within the pattern of depressions to provide the panel with strength to resist deflection from a load at various positions and orientations at the first outer surface.

The stiffening supports may comprise a pair of substantially parallel rails. Each of the rails may have a height substantially equal to depth of its respective depression.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 7 is a view similar to the view of FIG. 3, of yet another embodiment of a panel constructed in accordance with at least one embodiment of the present invention wherein the stiffening supports extend along the longitudinal axis of the vehicle; and FIG. 8 is an exploded perspective view, partially broken away and in cross section, taken along lines 8-8 of FIG. 7.

BRIEF DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the FIGS. 3 and 5-8, different embodiments of a sandwich-type, structural, compression-molded, composite panel having a pattern of depressions formed at a lower outer surface thereof and stiffening supports received and retained in the pattern of depressions, are generally indicated at 10, 10' and 10". In one example embodiment, the panel 10 (FIGS. 3 and 5) takes the form of an automotive vehicle load floor, which may be carpeted. It is to be understood that the panels 10, 10' and 10" constructed in accordance with at least one embodiment of the present invention may be used in a wide variety of environments besides the automotive vehicle environment of FIGS. 3 and 7.

Figure 1:
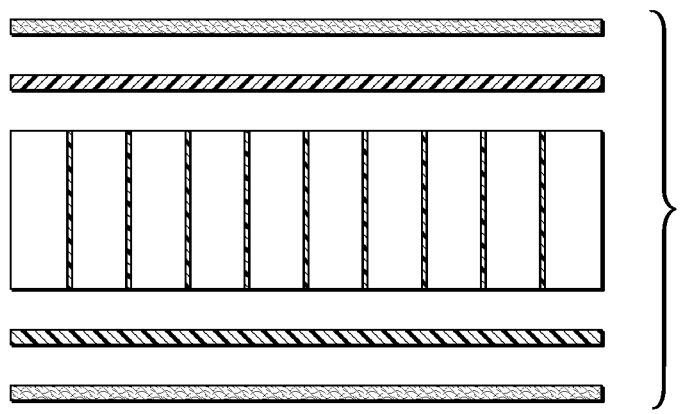
FIG. 1 is a side sectional view showing various separate layers of a prior art stack of thermoplastic-based layers of material.
Figure 2:
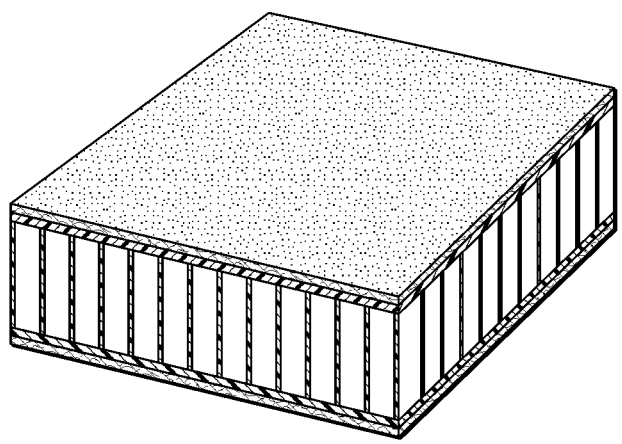
FIG. 2 is a top perspective view of the stack of FIG. 1 after compression molding.
Figure 5:
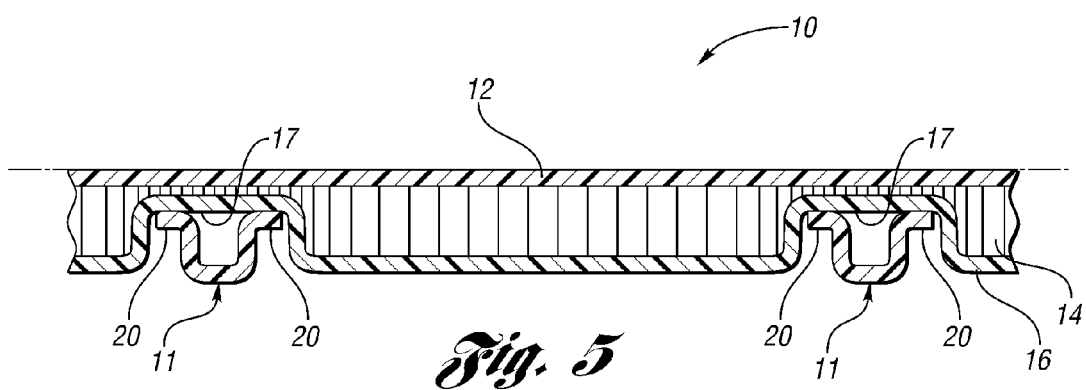
FIG. 5 is a view, similar to the view of FIG. 4, taken alone lines 5-5 of FIG. 3 and showing a sandwich-type, structural, composite panel having plastic stiffening supports and constructed in accordance with at least one embodiment of the present invention.

Referring to FIG. 5, the panel 10 (as well as the panels 10' and 10") is typically manufactured by providing a stack of materials located or positioned within a compression mold. The stack includes first and second reinforced thermoplastic skins or outer layers 12 and 16, respectively, and a core having a large number of cavities such as a thermoplastic cellular core 14 disposed between and bonded to the skins 12 and 16 by press molding within the compression mold. A covering or carpet layer (not shown), made of thermoplastics material may cover and be bonded to the first skin 12 to provide a top carpeted support surface as shown in prior art FIGS. 1 and 2. The skins 12 and 16 are heated typically outside of the mold to a softening temperature. The mold is preferably a low-pressure, compression mold which performs a thermo-compression process on the stack of materials.

Figure 3:
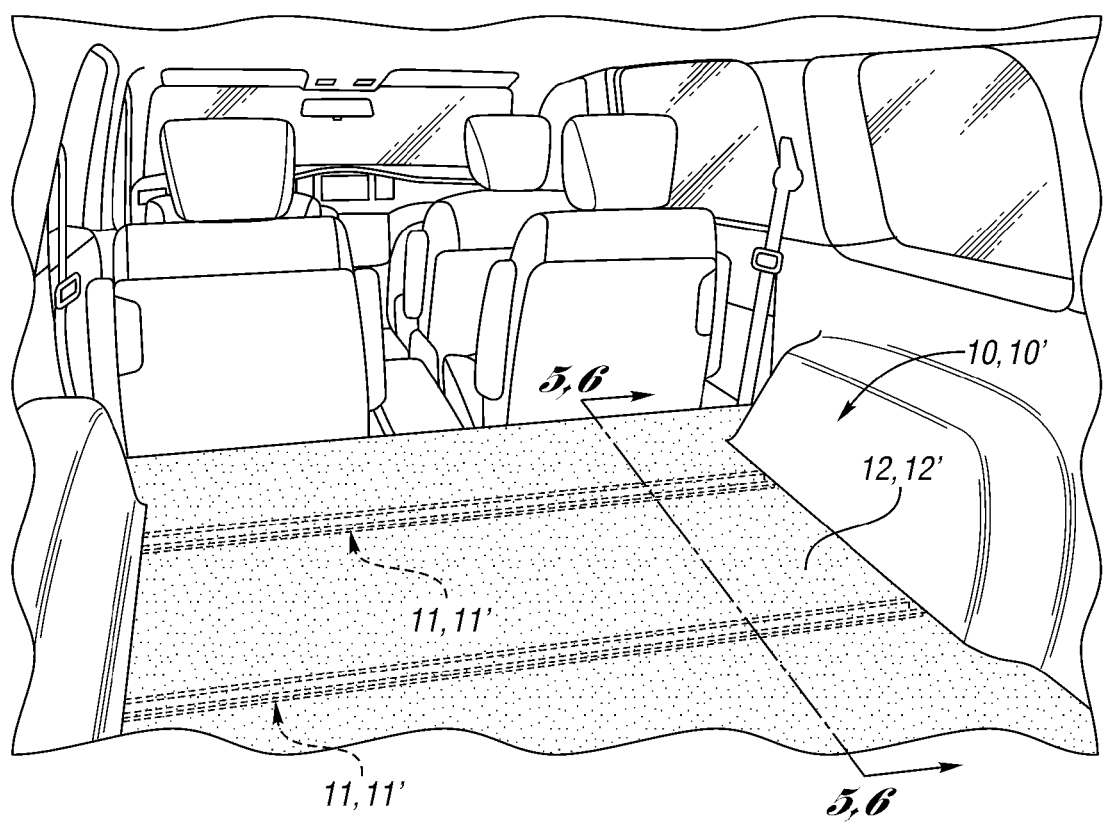
FIG. 3 is an environmental view, partially broken away, of an uncarpeted automotive vehicle load floor including a single sandwich-type, structural, composite panel constructed in accordance with at least one embodiment of the present invention.
Figure 4:
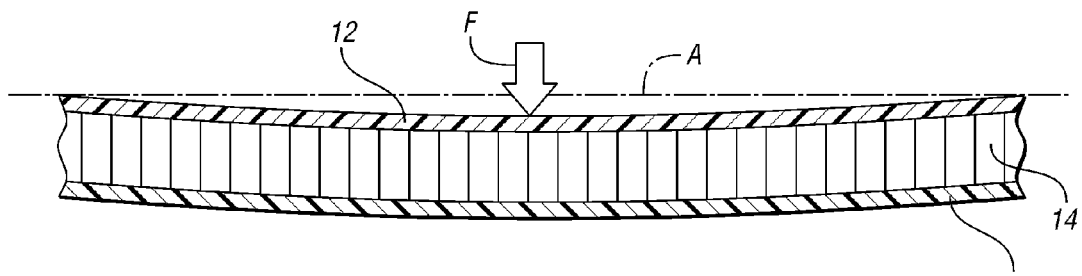
FIG. 4 is a view, partially broken away and in cross section, of a prior art sandwich type, composite panel showing a deflection from a baseline "A" upon the application of a force "F"

During the molding process, the inner surfaces of dies of the mold crush the core 14 of the panel 10 at predetermined locations. The crushed portions of the panel 10 have a reduced thickness and form a pattern of depressions 17 at the second outer surface of the second outer layer 16. The pattern of depressions 17 includes a pair of spaced, substantially parallel depressions which extend between opposite sides of the panel 10 as best shown in FIG. 3.

The panel 10 includes a plurality of stiffening supports, generally indicated at 11, bonded or joined to the second outer layer 16 within the patterns of depressions 17. The stiffening supports 11 are sized, shaped and arranged within the pattern of depressions 17 to provide the panel 10 with strength to resist deflection from a load at various positions and orientations at the first outer surface of the panel 10 shown in FIG. 3. The stiffening supports 11 preferably comprise a pair of substantially parallel, thermoplastic rails 11. Each of the rails 11 has a height substantially equal to depth of its respective depression 17 as shown in FIG. 5. Each of the rails 11 is u-shaped in cross-section. Each of the rails 11 has laterally extending flange portions 20 for bonding or joining the rails 11 to the second outer layer 16 in the pattern of depressions 17.

A wide variety of welding technologies exist to join or bond the plastic rails 11 and the outer layer 16 together such as: ultrasonic welding; vibration welding; thermal welding; spin welding; infrared welding; hot plate welding; and laser welding. U.S. Pat. Nos. 6,066,217 and 5,026,445 are examples of such welding technologies. Also, a wide variety of adhesives such as liquid and heat-sensitive solid film adhesive may be used to join the plastic components together. Oftentimes a mold is used in the bonding process. U.S. Pat. Nos. 8,133,419; 5,534,097 and 2011/0315310 are examples.

The rails 11 have longitudinal axes substantially parallel to each other. Each rail 11 is bonded to the panel 10 to locally reinforce the panel 10.

Figure 6:
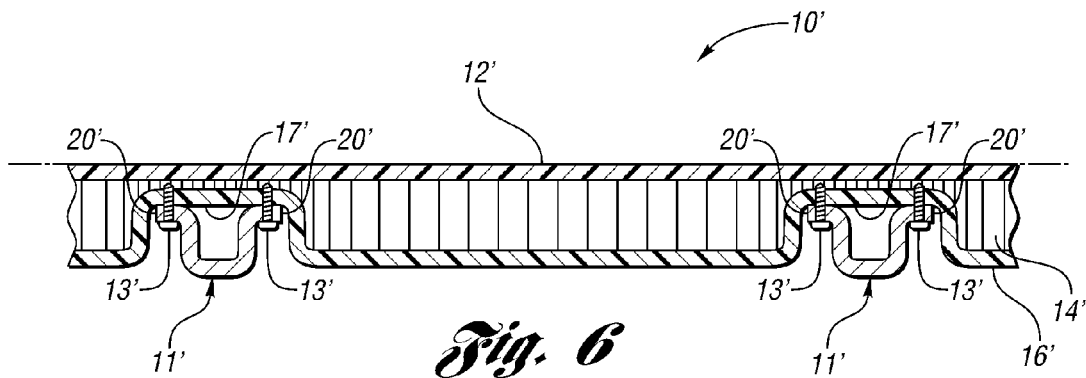
FIG. 6 is a view similar to the view of FIG. 5, taken along lines 6-6 of FIG. 3 and showing the panel with metal stiffening supports in accordance with another embodiment of the present invention.

The panel 10' of FIG. 6 is substantially identical to the panel 10 of FIG. 5 except the panel 10' has metal stiffening supports or rails 11'. Consequently, same or similar parts which perform the same or similar function have the same reference number but a single prime designation. Crushed portions of the composite panel 10' have a reduced thickness to form a pattern of depressions 17' which receive the metal rails 11' wherein height of the rails 11' is substantially equal to depth of the depressions 17'. Fasteners 13' extend through laterally extending flange portions 20' of the rails 11' and into the outer layer 16' to join the rails 11' to the outer layer 16' within the depressions 17'.

The panel 10" of FIGS. 7 and 8 is substantially identical as the panel 10' except the panel 10" has supports 11" which extend across the width of the storage area at the under surface of the panel 10" to support the panel 10". Consequently, the same or similar parts which perform the same or similar function have the same reference number but a double prime designation (except for the fasteners).

Crushed portions of the composite panel 10" have a reduced thickness to form a pattern of depressions 17" which receives the metal stiffening supports or rails 11" where, again, height of the rails 11" is substantially equal to depth of the depressions 17".

With respect to the supports or rails 11' and 11" of panels 10' and 10", respectively, holes (18" in FIG. 8) are formed through their respective flange portions 20' and 20". When aligned with holes (19" in FIG. 8) in the second outer layer 16' and 16", respectively, the aligned holes allow the joining of the rails 11' and 11" to the second outer layer 16' or 16" within their respective depressions 17' or 17" via fasteners 13' and 15", respectively.

The fasteners 13' and 15" may be threaded or non-threaded fasteners, for fastening the rails 11' and 11" to the outer layers 16' and 16", respectively. The fasteners may be any of various devices for fastening the rails 11' and 11" to the outer layers 16' and 16", respectively, such as an externally threaded screw or bolt. A screw is characterized by a helical ridge, or external thread wrapped around a cylinder. The screw threads typically mate with a complementary thread or internal thread in the rails 11' and 11" and the outer layers 16' and 16". The internal thread may be in the form of a nut or an object that has the internal thread formed into it. The screw thread may also cut a helical groove in the material of the rails 11' and 11" and the outer layers 16' and 16" as the screws are inserted. The heads of the screws may be decorative.

Each screw may be made from a wide range of materials, with steel being perhaps the most preferred, in many varieties. Where great resistance to corrosion is required, stainless steel, titanium, brass, bronze, monel or silicon bronze may be used. Galvanic corrosion of dissimilar metals can be prevented by a careful choice of material.

Some types of plastic, such as nylon or polytetrafluoroethylene (PTFE), can be threaded and used for fastenings requiring moderate strength and great resistance to corrosion or for the purpose of electrical insulation. A surface coating may be used to protect the fastener from corrosion (e.g. bright zinc plating for steel screws), to impart a decorative finish (e.g. jappaning) or otherwise alter the properties of the base material. Selection criteria of the screw materials include temperature, required strength, resistance to corrosion, joint material and cost.

The cellular core 14 (as well as the cores 14' and 14") may be a honeycomb core. In this example, the cellular cores 14, 14' and 14" have an open-celled structure of the type made up of tubes or a honeycomb, and are made mainly of polyolefin and preferably of polypropylene. It is also possible to use a cellular structure having closed cells of the foam type. The cores 14' and 14" may be made of polypropylene or aluminum honeycomb, balsa and polyurethane foam.

Each of the skins 12 and 16 (as well as skins 12' and 16', and skins 12" and 16") may be a fiber reinforced thermoplastic skin. The thermoplastic of the skins, and the cores 14, 14' and 14" may be polypropylene. At least one of the skins may be a woven skin, such as polypropylene skin. Each of the skins may be reinforced with fibers, e.g., glass fibers, carbon fibers or natural fibers. At least one of the skins may advantageously be made up of woven glass fiber fabric and of a thermoplastics material.

Each resulting panel 10, 10' or 10" may have a thickness in the range of 5 to 25 mm. The depressions 17, 17' and 17" may have a depth in the range of 2 to 10 mm.

In one example method of making the panel 10 (as well as the panels 10' and 10"), a stack of material is pressed in a low pressure, cold-forming mold. The stack is made up of the first skin 12, the cellular core 14, the second skin 16, and is pressed at a pressure lying in the range of $10 \times 10^5$ Pa. to $30 \times 10^5$ Pa. The first and second skins 12 and 16 are preferably pre-heated to make them malleable and stretchable. The first and second skins 12 and 16 have a forming temperature lying approximately in the range of 160° C. to 200° C., and, in this example, about 180° C.

In summary, FIGS. 3 and 5-8 show first, second and third embodiments of a sandwich-type, structural, composite panel 10, 10' and 10" having a pattern of depressions 17, 17' and 17", respectively, in which stiffening supports 11, 11' and 11" are received and retained. Each of the panels 10, 10' or 10" has basically the same structure and function as each of the other panels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sandwich-type, structural, composite, vehicle load floor panel comprising:
   a first outer layer having a first outer surface;
   a second outer layer having a second outer surface;
   a core positioned between the outer layers and having a plurality of cavities wherein the outer layers are bonded to the core by press molding and wherein crushed portions of the panel having a reduced thickness form a pattern of depressions at the second outer surface of the second outer layer; and
   a plurality of stiffening supports bonded or joined to the second outer layer within the pattern of depressions wherein the stiffening supports are retained in their respective depressions without a need for separate supports in a storage area beneath the load floor panel, the stiffening supports being sized, shaped and arranged within the pattern of depressions to provide the panel with strength to resist deflection from a load at various positions and orientations at the first outer surface.

2. The panel as claimed in claim 1, wherein the stiffening supports comprise a pair of substantially parallel rails, each of the rails having a height substantially equal to depth of its respective depression.

3. The panel as claimed in claim 2, wherein each of the rails is u-shaped in cross-section and wherein each of the rails has laterally extending flange portions for bonding or joining the rails to the second outer layer in the pattern of depressions.

4. The panel as claimed in claim 1, wherein the pattern of depressions includes a pair of spaced, substantially parallel depressions which extend between opposite sides of the panel.

5. The panel as claimed in claim 1, wherein each of the stiffening supports is made of a plastic and wherein each of the stiffening supports is bonded to the outer surface of the second outer layer within its respective depression.

6. The panel as claimed in claim 1, further comprising a plurality of fasteners to fasten the stiffening supports to the second outer layer within the pattern of depressions.

7. The panel as claimed in claim 6, wherein the fasteners are threaded fasteners which extends completely through their respective stiffening components.

8. The panel as claimed in claim 7, wherein each of the fasteners is externally threaded.

9. The panel as claimed in claim 1, wherein the core is a cellular core.

10. The panel as claimed in claim 1, wherein the core is a thermoplastic core.

11. The panel as claimed in claim 1, wherein the core is a honeycomb core.

12. The panel as claimed in claim 1, wherein the outer layers are fiber reinforced layers.

13. The panel as claimed in claim 1, wherein the panel has a thickness in a range of 5 to 25 mm.

14. The panel as claimed in claim 1, wherein the outer layers are thermoplastic layers and the core is a thermoplastic core.

15. The panel as claimed in claim 1, wherein at least one of the outer layers is a woven outer layer.

16. The panel as claimed in claim 15, wherein each of the outer layers is a woven outer layer.

\* \* \* \* \*

UNITED STATES PATENT AND TRADEMARK OFFICE
CERTIFICATE OF CORRECTION

PATENT NO. : 8,808,834 B2  
APPLICATION NO. : 13/762832  
DATED : August 19, 2014  
INVENTOR(S) : Darius J. Preisler et al.

Page 1 of 1

It is certified that error appears in the above-identified patent and that said Letters Patent is hereby corrected as shown below:

In the Claims

Column 8, Line 26, Claim 7:

After "threaded fasteners which"  
Delete "extends" and  
Insert -- extend --.

Signed and Sealed this  
Twenty-third Day of December, 2014

Michelle K. Lee  
*Deputy Director of the United States Patent and Trademark Office*